United States Patent
Kim

(10) Patent No.: US 11,623,608 B2
(45) Date of Patent: Apr. 11, 2023

(54) VEHICLE AND METHOD OF CONTROLLING THE SAME, AND SEAT BELT APPARATUS

(71) Applicants: Hyundai Motor Company, Seoul (KR); Kia Motors Corporation, Seoul (KR)

(72) Inventor: Hyunsu Kim, Uiwang-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 437 days.

(21) Appl. No.: 16/590,154

(22) Filed: Oct. 1, 2019

(65) Prior Publication Data

US 2020/0180553 A1    Jun. 11, 2020

(30) Foreign Application Priority Data

Dec. 7, 2018  (KR) .................. 10-2018-0157527

(51) Int. Cl.

| B60R 22/195 | (2006.01) |
|---|---|
| B60R 22/48 | (2006.01) |
| B60W 40/09 | (2012.01) |
| B60W 30/085 | (2012.01) |
| B60R 21/01 | (2006.01) |

(52) U.S. Cl.
CPC ............ *B60R 22/195* (2013.01); *B60R 22/48* (2013.01); *B60W 30/085* (2013.01); *B60W 40/09* (2013.01); *B60R 2021/01272* (2013.01)

(58) Field of Classification Search
CPC ........ B60R 22/195; B60R 2021/01272; B60R 21/0132; B60R 22/46; B60R 22/19
See application file for complete search history.

(56) References Cited

U.S. PATENT DOCUMENTS 5,552,986 A * 9/1996 Omura .................. B60R 21/01
                                                                         180/268
5,558,370 A    9/1996 Behr
                 (Continued)

FOREIGN PATENT DOCUMENTS

| CN | 1990310 A | 7/2007 |
|---|---|---|
| CN | 101085612 A | 12/2007 |

(Continued)

*Primary Examiner* — Frank B Vanaman
(74) *Attorney, Agent, or Firm* — Morgan, Lewis & Bockius LLP

(57) ABSTRACT

A vehicle and a method of controlling the vehicle may include a seat belt apparatus to reduce the tension of the seat belt in the normal situation in which the collision does not occur by appropriately adjusting the tension of the seat belt based on the driving state of the vehicle, providing convenience to a passenger. In the collision situation, the safety of the passenger may be ensured by sufficiently increasing the tension of the seat belt. The vehicle according to an exemplary embodiment of the present invention includes: a seat belt provided to adjust a tension; a driving assistance device configured to obtain vehicle driving information for assisting a driving of the vehicle; and a controller coupled to the driving assistance and configured to adjust the tension of the seat belt to correspond to a driving state of the vehicle based on the vehicle driving information obtained through the driving assistance device.

18 Claims, 14 Drawing Sheets

(56) References Cited

U.S. PATENT DOCUMENTS

| | | | | |
|---|---|---|---|---|
| 5,765,869 | A * | 6/1998 | Huber | B60R 21/18 |
| | | | | 280/733 |
| 5,788,281 | A * | 8/1998 | Yanagi | B60R 21/013 |
| | | | | 180/282 |
| 6,213,512 | B1 * | 4/2001 | Swann | B60R 22/46 |
| | | | | 180/271 |
| 6,257,363 | B1 * | 7/2001 | Midorikawa | B60R 22/44 |
| | | | | 180/268 |
| 6,374,168 | B1 * | 4/2002 | Fujii | B60R 22/44 |
| | | | | 180/268 |
| 7,431,340 | B2 | 10/2008 | Midorikawa | |
| 7,869,921 | B2 | 1/2011 | Bolton et al. | |
| 7,908,058 | B2 | 3/2011 | Takemura | |
| 7,992,669 | B2 | 8/2011 | Odate et al. | |
| 2006/0090946 | A1 * | 5/2006 | Zhao | B60R 22/02 |
| | | | | 180/268 |
| 2006/0226648 | A1 * | 10/2006 | Cuddihy | B60R 21/0132 |
| | | | | 280/806 |
| 2007/0144811 | A1 | 6/2007 | Tanaka et al. | |
| 2017/0235306 | A1 * | 8/2017 | Seki | B60W 40/08 |
| | | | | 701/23 |

FOREIGN PATENT DOCUMENTS

| | | |
|---|---|---|
| CN | 103569034 A | 2/2014 |
| CN | 103818340 A | 5/2014 |
| CN | 103950420 A | 7/2014 |
| CN | 106080499 A | 11/2016 |
| JP | 200784069 A | 4/2007 |
| KR | 10-2005-0108344 | 11/2005 |
| KR | 10-2015-0011090 A | 1/2015 |

* cited by examiner

VEHICLE AND METHOD OF CONTROLLING THE SAME, AND SEAT BELT APPARATUS

CROSS-REFERENCE TO RELATED APPLICATION(S)

The present application claims priority to Korean Patent Application No. 10-2018-0157527, filed on Dec. 7, 2018 in the Korean Intellectual Property Office, the entire contents of which is incorporated herein for all purposes by this reference.

BACKGROUND OF THE INVENTION

Field of the Invention

The present invention relate to a vehicle, and more particularly, to control of a seat belt provided in the vehicle.

Description of Related Art

A seat belt mounted on a vehicle fixes a passenger's position on a seat while the vehicle is driving, preventing a secondary injury from occurring due to an impact force at the time of a collision.

The seat belt always maintains tension above a certain level, so that pregnant women or elderly people may feel uncomfortable because the passenger is pressed in a situation where there is no collision, that is, in a normal situation.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to reducing a tension of a seat belt in a normal situation in which a collision does not occur by appropriately adjusting the tension of the seat belt based on a driving state of the vehicle, providing convenience to a passenger. In a collision situation, the safety of the passenger may be ensured by sufficiently increasing the tension of the seat belt.

Additional aspects of the present invention will be set forth in portion in the description which follows and, in part, will be obvious from the description, or may be learned by practice of the present invention.

In accordance with an aspect of the present invention, a vehicle includes: a seat belt provided to adjust a tension; a driving assistance device configured to obtain vehicle driving information for assisting a driving of the vehicle; and a controller coupled to the driving assistance and configured to adjust the tension of the seat belt to correspond to a driving state of the vehicle based on the vehicle driving information obtained through the driving assistance device.

The controller may be configured to determine at least one of a collision risk level of the vehicle and a vehicle behavior risk level based on the vehicle driving information, and adjust the tension of the seat belt based on at least one of the collision risk level and the vehicle behavior risk level.

The controller may classify the collision risk level and the vehicle behavior risk level into a plurality of risk levels, and adjust the tension of the seat belt to cope with any one of the plurality of risk levels corresponding to a current driving state of the vehicle.

The tension of the seat belt may include a first tension having a minimum tension enough not to press a passenger and a second tension having a large tension to restrain the passenger's body to a seat of the vehicle.

A plurality of tensions greater than the first tension and smaller than the second tension are further provided between the first tension and the second tension.

The collision risk level may include a plurality of levels different from each other. The vehicle behavior risk level may include a plurality of levels different from each other.

The controller may be configured to determine a plurality of final risk levels from a combination of the plurality of collision risk levels and the plurality of vehicle behavior risk levels, and adjust the tension of the seat belt based on a level of the highest risk among the plurality of final risk levels.

The vehicle may further include: a motor configured to adjust the tension of the seat belt. The controller may be configured to control the motor to implement the tension corresponding to each of the plurality of final risk levels.

The controller may preset a control amount of the motor configured for implementing the tension corresponding to each of the plurality of final risk levels, and control the motor with the control amount corresponding to the selected final risk level when the level of the highest risk among the plurality of final risk levels is selected.

The driving assistance device may include an ADVANCED DRIVE ASSISTANCE SYSTEM (ADAS).

The driving assistance device may include an AIRBAG CONTROL UNIT (ACU).

The driving assistance device may include an ELECTRONIC STABILITY CONTROL (ESC).

In accordance with another aspect of the present invention, a method of controlling a vehicle includes: obtaining vehicle driving information for assisting a driving of the vehicle; and adjusting the tension of the seat belt to correspond to a driving state of the vehicle based on the vehicle driving information.

The adjusting of the tension of the seat belt may include determining at least one of a collision risk level of the vehicle and a vehicle behavior risk level based on the vehicle driving information; and adjusting the tension of the seat belt based on at least one of the collision risk level and the vehicle behavior risk level.

The adjusting of the tension of the seat belt may include classifying the collision risk level and the vehicle behavior risk level into a plurality of risk levels; and adjusting the tension of the seat belt to cope with any one of the plurality of risk levels corresponding to a current driving state of the vehicle.

The tension of the seat belt may include a first tension having a minimum tension enough not to press a passenger and a second tension having a large tension to restrain the passenger's body to a seat of the vehicle.

A plurality of tensions greater than the first tension and smaller than the second tension are further provided between the first tension and the second tension.

The collision risk level may include a plurality of levels different from each other. The vehicle behavior risk level may include a plurality of levels different from each other.

The adjusting of the tension of the seat belt may include determining a plurality of final risk levels from a combination of the plurality of collision risk levels and the plurality of vehicle behavior risk levels; and adjusting the tension of the seat belt based on a level of the highest risk among the plurality of final risk levels.

The adjusting of the tension of the seat belt may include implementing the tension corresponding to each of the plurality of final risk levels using a motor.

The adjusting of the tension of the seat belt may include presetting a control amount of the motor configured for implementing the tension corresponding to each of the plurality of final risk levels; and when the level of the highest risk among the plurality of final risk levels is selected, controlling the motor with the control amount corresponding to the selected final risk level.

The method may further include: obtaining the vehicle driving information using a driving assistance device. The driving assistance device may include the ADAS.

The driving assistance device may include the ACU.

The driving assistance device may include the ESC.

In accordance with another aspect of the present invention, a vehicle includes: a seat belt provided to adjust a tension; a driving assistance device configured to obtain vehicle driving information for assisting a driving of the vehicle; and a controller coupled to the driving assistance and configured to adjust the tension of the seat belt to correspond to a driving state of the vehicle based on the vehicle driving information obtained through the driving assistance device. The driving assistance device may include at least one of the ADAS, the ACU, and the ESC. The driving assistance device may determine the collision risk level of the vehicle based on the vehicle driving information obtained through the ADAS and the ACU, determine the behavior risk level of the vehicle based on the vehicle driving information obtained through the ESC, and adjust the tension of the seat belt based on at least one of the collision risk level and the vehicle behavior risk level.

In accordance with another aspect of the present invention, a method of controlling a vehicle includes: obtaining vehicle driving information for assisting a driving of the vehicle; and adjusting the tension of the seat belt to correspond to a driving state of the vehicle based on the vehicle driving information. The vehicle driving information may be obtained through the driving assistance device. The driving assistance device may include at least one of the ADAS, the ACU, and the ESC. The driving assistance device may determine the collision risk level of the vehicle based on the vehicle driving information obtained through the ADAS and the ACU, determine the behavior risk level of the vehicle based on the vehicle driving information obtained through the ESC, and adjust the tension of the seat belt based on at least one of the collision risk level and the vehicle behavior risk level.

In accordance with another aspect of the present invention, a seat belt apparatus includes: a seat belt provided to adjust a tension; and a controller configured to adjust the tension of the seat belt to correspond to a driving state of the vehicle based on vehicle driving information obtained through the driving assistance device that obtains the vehicle driving information for assisting a driving of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
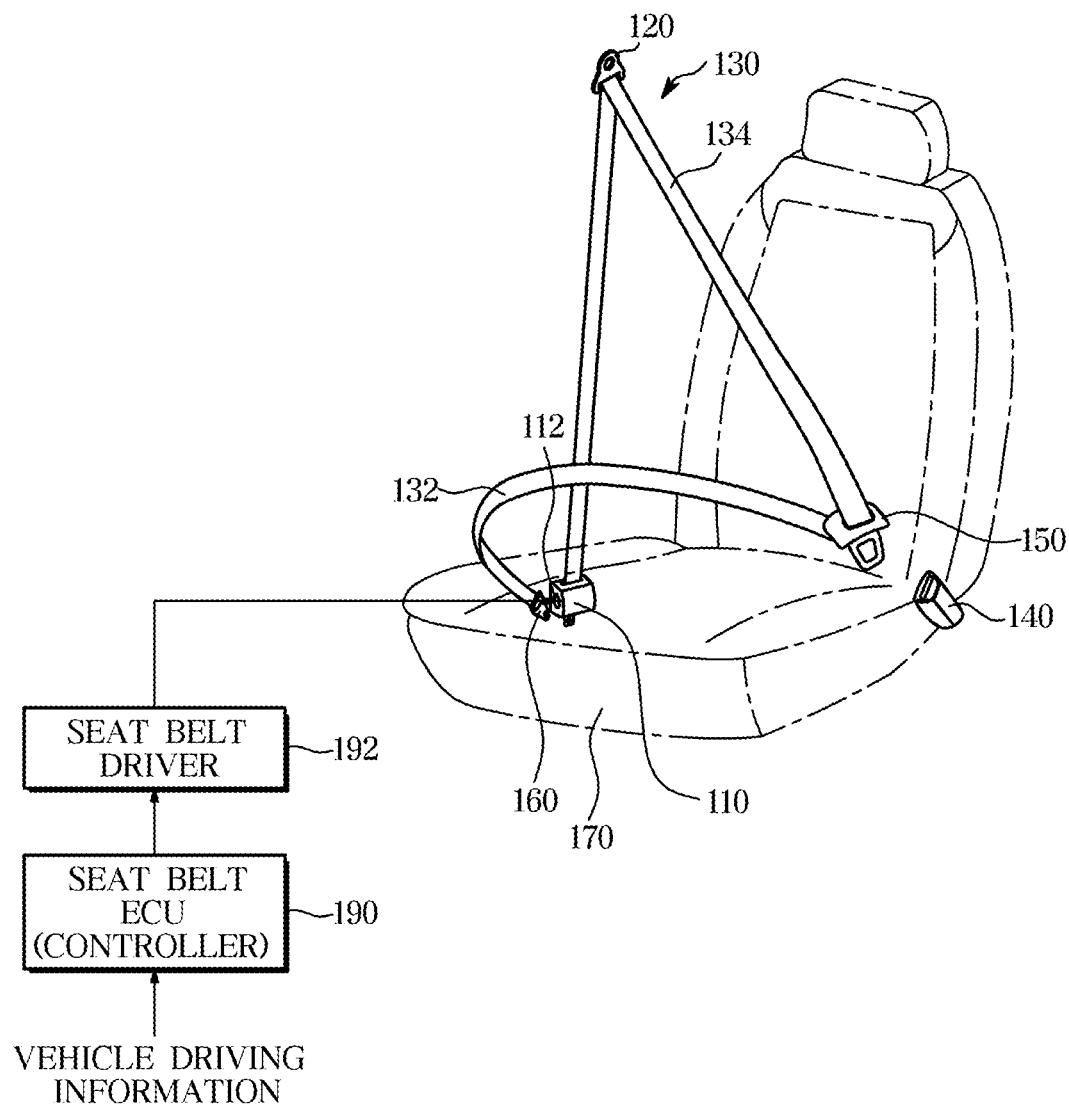
FIG. 1 is a view schematically illustrating a configuration of a seat belt module according to embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

FIG. 1 is a view schematically illustrating a configuration of a seat belt module according to embodiments of the present invention.

As illustrated in FIG. 1, a seat belt module may include a retractor 110, an upper anchor 120, a lower anchor 160, a seat belt 130, a seat belt reel 112, a buckle 140, a tongue plate 150, a seat belt driver 192, and a seat belt Electronic Control Unit (ECU) 190.

The retractor 110 may be fixed to a lower end portion of a center pillar, and the seat belt 130 may be wound on the seat belt reel 112 rotatably mounted on the retractor 110. The seat belt reel 112 may be connected to a rotation axis of a motor 302 (see FIG. 3) to be interlocked. The retractor 110 may include the motor 302. Accordingly, a restraining force of the seat belt 130 may be controlled by the rotation driving of the motor 302.

The webbing-type seat belt 130 may be inserted through the upper anchor 120 which is pulled out of the retractor 110 and fixed to an upper end portion of the center pillar. The seat belt 130 may be fastened by the buckle 140 and the tongue plate 150 provided at a lower end portion of the seat 10 to thereby restrain the passenger.

The seat belt 130 supporting the passenger includes a chest belt 134 for supporting the passenger's chest diagonally and a waist belt 132 for supporting the passenger's waist. One end portion of the waist belt 132 may be fixed to the lower anchor 160 and the lower anchor 160 may be fixed to the side of the seat 10 or the lower end portion of the center pillar.

With the present structure, the seat belt module may maintain a loose state so that the passenger can move comfortably while the vehicle is in driving, and the seat belt ECU 190 may control the restraining force of the seat belt 130 by driving the motor 302 when the vehicle is in a dangerous situation such as the collision or sudden deceleration (sudden stop). By controlling the restraint force of the seat belt 130, the passenger's body may be restrained to the seat 10 by pulling the seat belt 130 to an appropriate level suitable for the dangerous situation and maintaining the proper tension of the seat belt 130. The passenger's body may be restrained to the seat 10 through a pull-out length and a tension adjustment of the seat belt 130, preventing the passenger's body from leaning toward the front of the vehicle. In the seat belt module of the vehicle, the seat belt ECU 190, which controls the entire operation of the seat belt module, may generate a seat belt driving signal based on vehicle driving information obtained through various devices in the vehicle. The seat belt driving signal generated in the seat belt ECU 190 may be transmitted to the seat belt driver 192 and the seat belt driver 192 may drive the seat belt 130 in a response to the received seat belt driving signal.

In the exemplary embodiment of the present invention, the seat belt ECU 190 may adjust the tension of the seat belt 130 according to a driving state of the vehicle, achieving convenience and safety for the passenger. For example, the tension of the seat belt 130 may be classified into a plurality of steps such as a release step, an approach step, a warning step, a risk step, and a collision step according to the state of the vehicle. In a normal situation such as the release step, the tension of the seat belt 130 is loosened to facilitate the occupant. In a very urgent situation such as the collision step, the tension of the seat belt 130 is strengthened to restrain the passenger's body to secure the passenger.

In the exemplary embodiment of the present invention, the tension of the seat belt 130 may be adjusted based on the vehicle driving information. Here, the vehicle driving information may include vehicle's own state information and vehicle's surrounding state information. In the present invention, a reference for adjusting the tension of the seat belt 130 will be described in detail with reference to FIG. 2, FIG. 3 and FIG. 4 described later.

FIG. 2 is a view exemplarily illustrating a control system of a vehicle according to embodiments of the present invention. FIG. 2A is a view exemplarily illustrating an entire configuration of a control system for controlling a seat belt. An ADVANCED DRIVE ASSISTANCE SYSTEM (ADAS), an AIRBAG CONTROL UNIT (ACU) 242, and an ELECTRONIC STABILITY CONTROL (ESC) 272 illustrated in FIG. 2 are both a driving assistance device configured for assisting the driving of the vehicle.

Figure 2A:
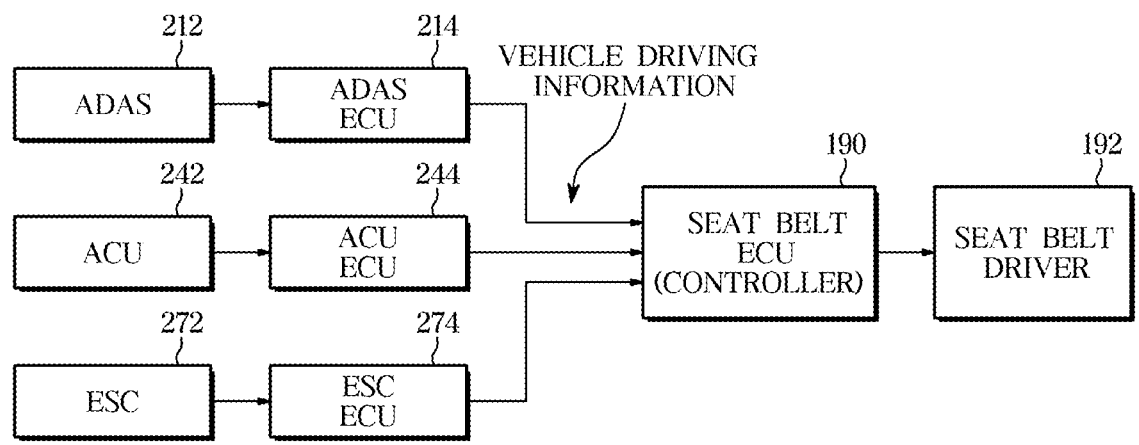
FIG. 2A is a view exemplarily illustrating an entire configuration of a control system for controlling a seat belt.
Figure 2B:
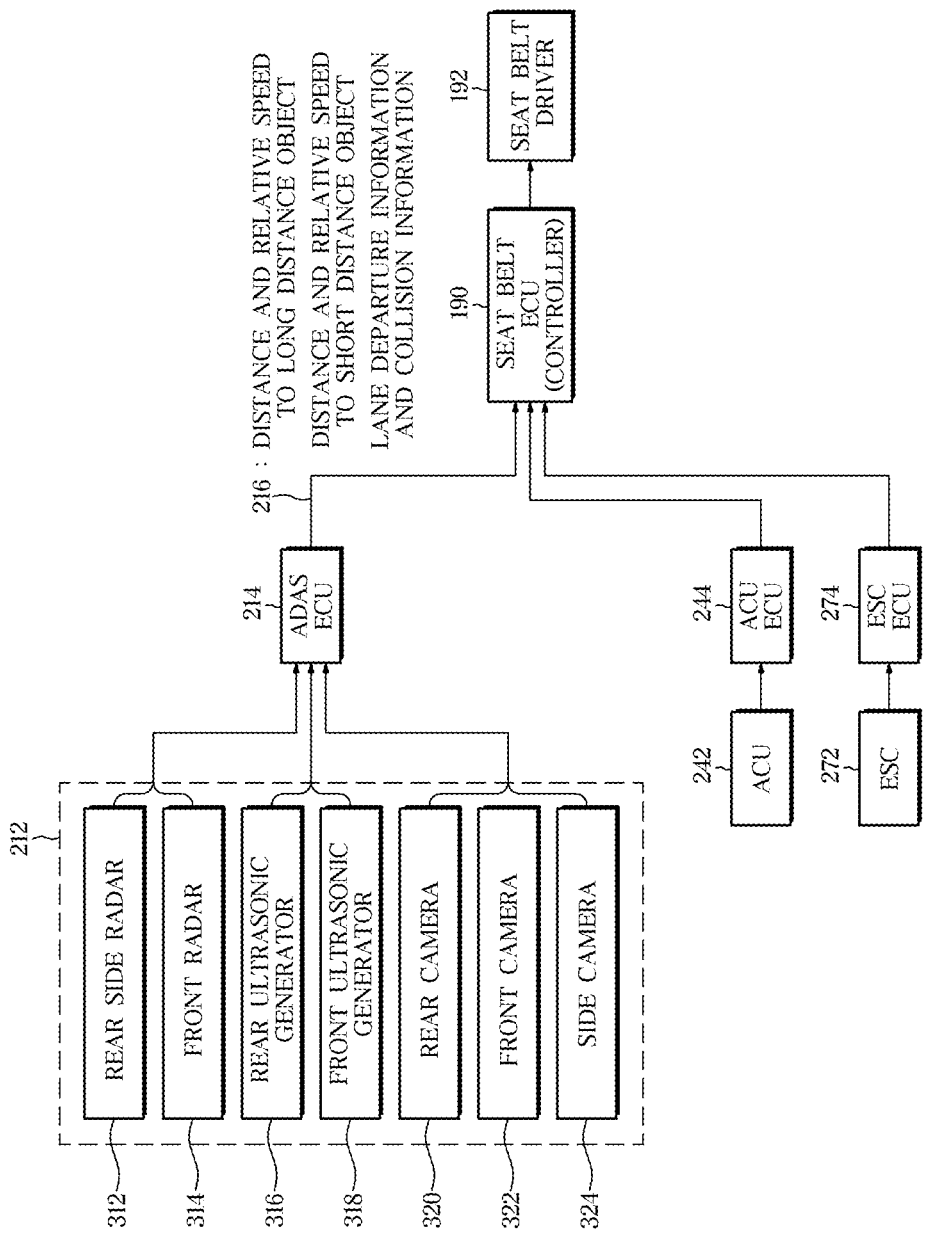
FIG. 2B is a view exemplarily illustrating a detailed configuration of an ADVANCED DRIVE ASSISTANCE SYSTEM (ADAS)
Figure 2C:
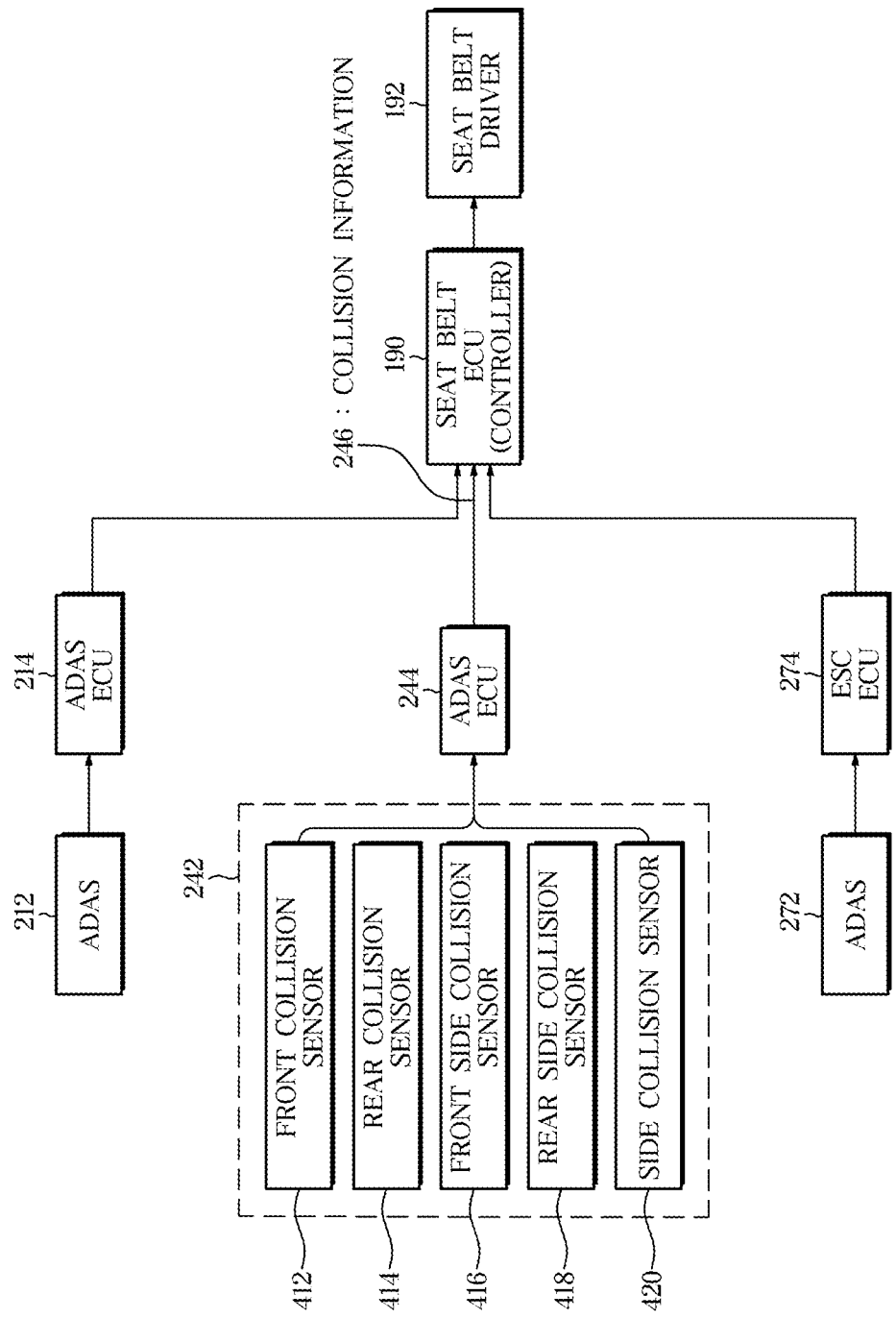
FIG. 2C is a view exemplarily illustrating a detailed configuration of an AIRBAG CONTROL UNIT (ACU)
Figure 2D:
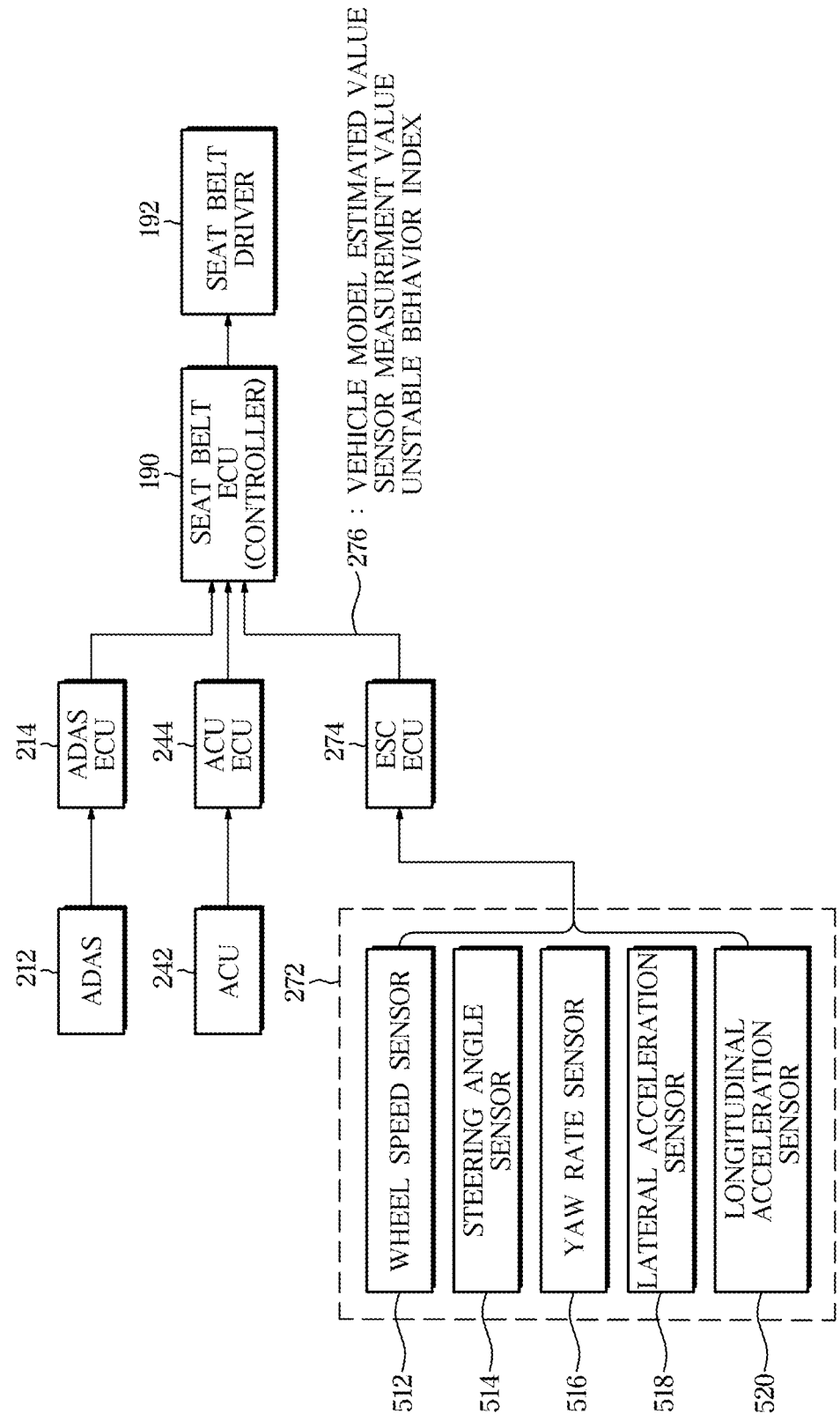
FIG. 2D is a view exemplarily illustrating a detailed configuration of an ELECTRONIC STABILITY CONTROL (ESC)

FIG. 2B is a view exemplarily illustrating a detailed configuration of an ADVANCED DRIVE ASSISTANCE SYSTEM (ADAS). The ADAS 212 may be an 'ADVANCED DRIVE ASSISTANCE SYSTEM', which is a driving assistance system. FIG. 2C is a view exemplarily illustrating a detailed configuration of an AIRBAG CONTROL UNIT (ACU). The ACU 242 may be an 'AIRBAG CONTROL UNIT' for controlling an airbag. FIG. 2D is a view exemplarily illustrating a detailed configuration of an ELECTRONIC STABILITY CONTROL (ESC). The ESC 272 may be an 'ELECTRONIC STABILITY CONTROL', which is a vehicle dynamic device.

In the description of FIG. 1, a tension adjustment of the seat belt 130 may be determined according to the vehicle driving information and the vehicle driving information may include the vehicle's own state information and the vehicle's surrounding state information. In the vehicle according to embodiments of the present invention, the vehicle driving information as the reference for adjusting the tension of the seat belt 130 may be generated from the information (signal) generated by the ADAS 212, the ACU 242, and the ESC 272 as illustrated in FIG. 2.

That is, the seat belt ECU 190 may receive signals related to the vehicle driving information obtained through the ADAS 212, the ACU 242, and the ESC 272 as the vehicle driving information through an ADAS ECU 214, an ACU ECU 244, and an ESC ECU 274, respectively, and generate a seat belt driving signal. The seat belt driver 192 may drive the seat belt 130 in a response to the seat belt driving signal generated by the seat belt ECU 190. The driving of the seat belt 130 may include the tension adjustment of the seat belt 130.

As illustrated in FIG. 2B, the ADAS 212 may include a rear side radar 312 and a front radar 314, a rear ultrasonic generator 316, a front ultrasonic generator 318, a rear camera 320, a front camera 322, and a side camera 324.

The vehicle driving information obtained by the ADAS 212 may include a distance and a relative speed between the vehicle and a recognized object in each direction (front, rear, side, rear side, and the like) of the vehicle.

The ADAS ECU 214 may receive distance information and speed information from the rear side radar 312 and the front radar 314 of the ADAS 212 to the object located at a relatively long distance in each direction thereof. The ADAS ECU 214 may also receive the distance information and the speed information from the rear ultrasonic generator 316 and the front ultrasonic generator 318 of the ADAS 212 to the object located at a relatively short distance in each direction thereof. The ADAS ECU 214 may also receive type information related to the object from the rear camera 320, the front camera 322, and the side camera 324 of the ADAS 212. The ADAS ECU 214, as illustrated by reference numeral 216 in FIG. 2B, may generate a 'distance and relative speed to a long distance object', a 'distance and relative speed to a short distance object', and 'lane departure information and collision information' by processing the signals received from the ADAS 212, and may transmit them to seat belt ECU 190.

As illustrated in FIG. 2C, the ACU 242 may include a front collision sensor 412, a rear collision sensor 414, a front side collision sensor 416, a rear side collision sensor 418, and a side collision sensor 420.

The vehicle driving information obtained by the ACU 242 may include a collision determination result for each direction (front, rear, side, rear side, and the like) of the vehicle obtained through processing of a collision signal related to the deployment of an airbag.

The ACU ECU 244 may generate the 'collision information' in each direction by processing the collision signals received from the front collision sensor 412, the rear collision sensor 414, the front side collision sensor 416, the rear side collision sensor 418, as illustrated by reference numeral 246 in FIG. 2C, and the side collision sensor 420, and may transmit the generated 'collision information' to the seat belt ECU 190.

As illustrated in FIG. 2C, the ESC 272 may include a wheel speed sensor 512, a steering angle sensor 514, a yaw rate sensor 516, a lateral acceleration sensor 518, and a longitudinal acceleration sensor 520.

The vehicle driving information obtained by the ESC 272 may include information related to (Yaw, roll, pitch, a steering angle, vehicle speed, etc.) related to a behavior of the vehicle obtained from the detected values of the wheel speed sensor 512, the steering angle sensor 514, the yaw rate sensor 516, the lateral acceleration sensor 518, and the longitudinal acceleration sensor 520 a physical quantity (yaw, roll, pitch, a steering angle, vehicle speed, etc.) related to the behavior of the vehicle.

The ESC ECU 272 may receive rotation speed information related to each of four wheels FL, FR, RL, and RR from the wheel speed sensor 512. Also, the ESC ECU 272 may receive a steering input and a steering angular velocity from the steering angle sensor 514. The ESC ECU 272 may also receive yaw rate information, a lateral acceleration information, and longitudinal acceleration information from the yaw rate sensor 516, the lateral acceleration sensor 518, and the longitudinal acceleration sensor 520, respectively. The ESC ECU 274 may generate a 'vehicle model estimated value', a 'sensor measurement value', and an 'unstable behavior index' by processing the signals received from the ESC 272 as illustrated by reference numeral 276 in FIG. 2D, and may transmit them to the seat belt ECU 190.

In the vehicle according to embodiments of the present invention illustrated in FIG. 2, the driving assistance device configured for obtaining the vehicle driving information is not limited to the ADAS 212, the ACU 242, and the ESC 272 illustrated in FIG. 2A. Some or all of the ADAS 212, the ACU 242, and the ESC 272 may be replaced by other components performing operations in accordance with the ADAS 212, the ACU 242, and the ESC 272. Furthermore, the detailed devices forming the ADAS 212, the ACU 242, and the ESC 272 are not limited to those illustrated in FIG. 2B, FIG. 2C, and FIG. 2D. Some or all of the detailed devices forming each of the ADAS 212, the ACU 242, and the ESC 272 may be replaced by other components performing operations in accordance with the detailed devices forming the ADAS 212, the ACU 242, and the ESC 272. For driving the seat belt 130, the seat belt ECU 190 may operate the same or similar manner as the ADAS 212, the ACU 242, and the ESC 272, but may utilize components called other names.

FIG. 3 is a view exemplarily illustrating a structure for active control of tension of a seat belt module according to embodiments of the present invention.

Figure 3A:
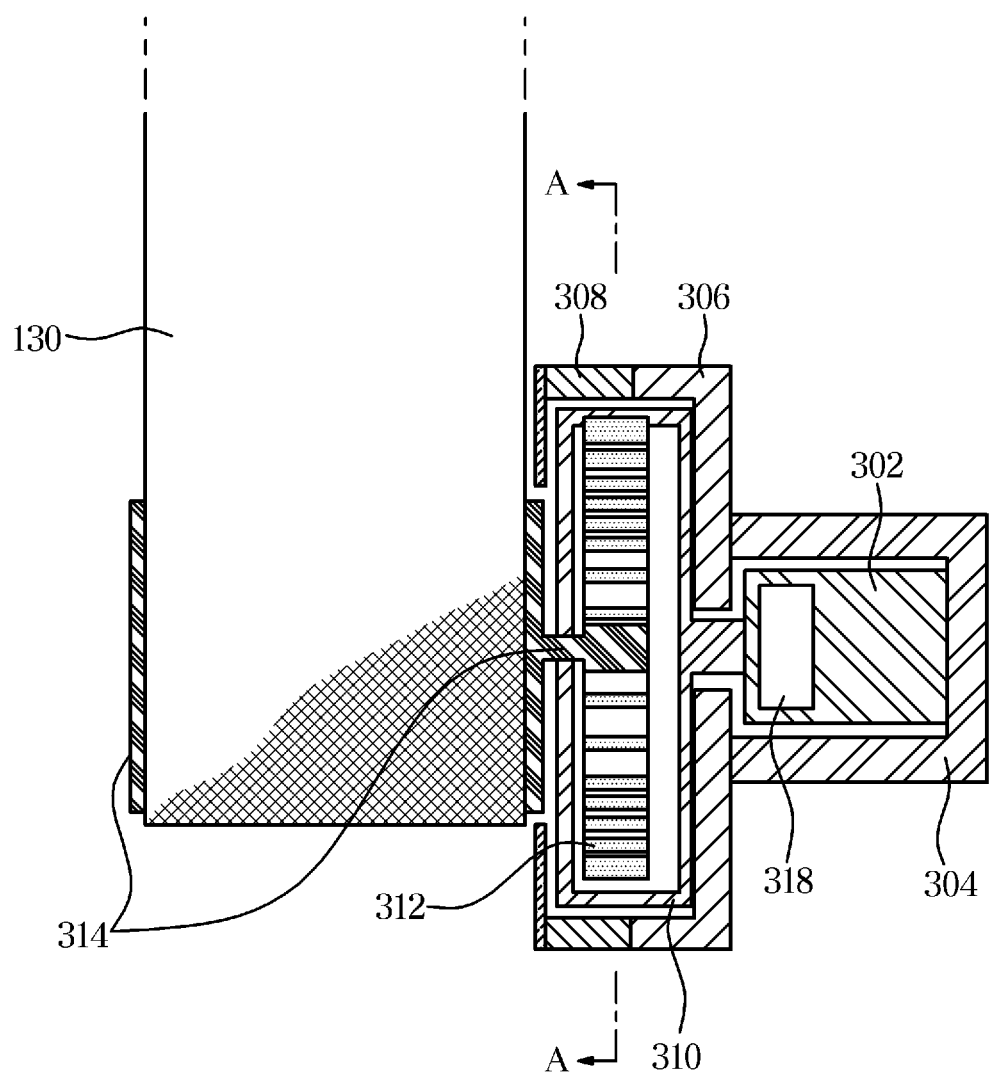
FIGS. 3A, 3B and 3C are views exemplarily illustrating a structure for active control of tension of a seat belt module according to embodiments of the present invention.

As illustrated in FIG. 3A, in the seat belt module, a motor 302 may be used to adjust a rotation speed of a tension spring 312 of the seat belt 130. The motor 302 may be fixed to a motor housing 304 and the motor housing 304 may be fixed to an external housing upper portion 306 of the tension spring 312. The external housing upper portion 306 may be connected to an external housing lower portion 308 and surround an internal rotating body 310 to which the end portion of the tension spring 312 is fixed. The opposite end portion of the tension spring 312 may be fixed to a rotation portion 314 of the seat belt 130. A reduction gear 318 may be incorporated in the motor 302 and the motor 302 may be connected to the internal rotating body 310 through the reduction gear 318 so that a torque of the motor 302 is transmitted to the internal rotating body 310.

Figure 3B:
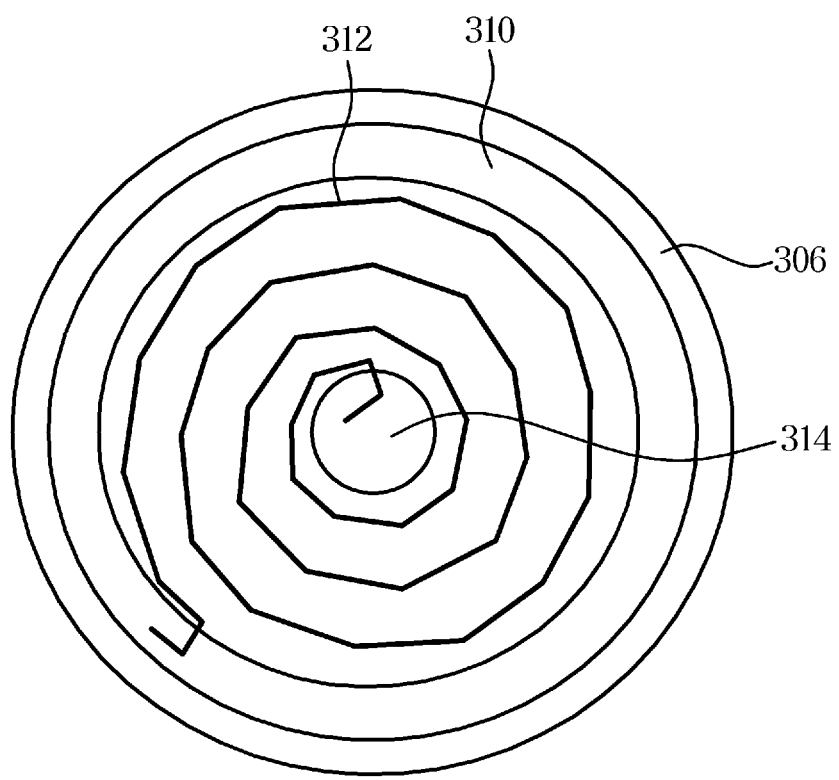

FIG. 3B is a cross-sectional view of the tension spring 312 taken along line A-A'. One end portion of the tension spring 312 may be fixed to the internal rotating body 310. The other end portion of the tension spring 312 may be fixed to the seat belt rotating portion 314. The seat belt 130 may be wound around the seat belt rotating portion 314 and a spring tension of the tension spring 312 may be finally transmitted to the seat belt 130 through the seat belt rotating portion 314, generating a seat belt tension felt by the passenger.

Figure 3C:
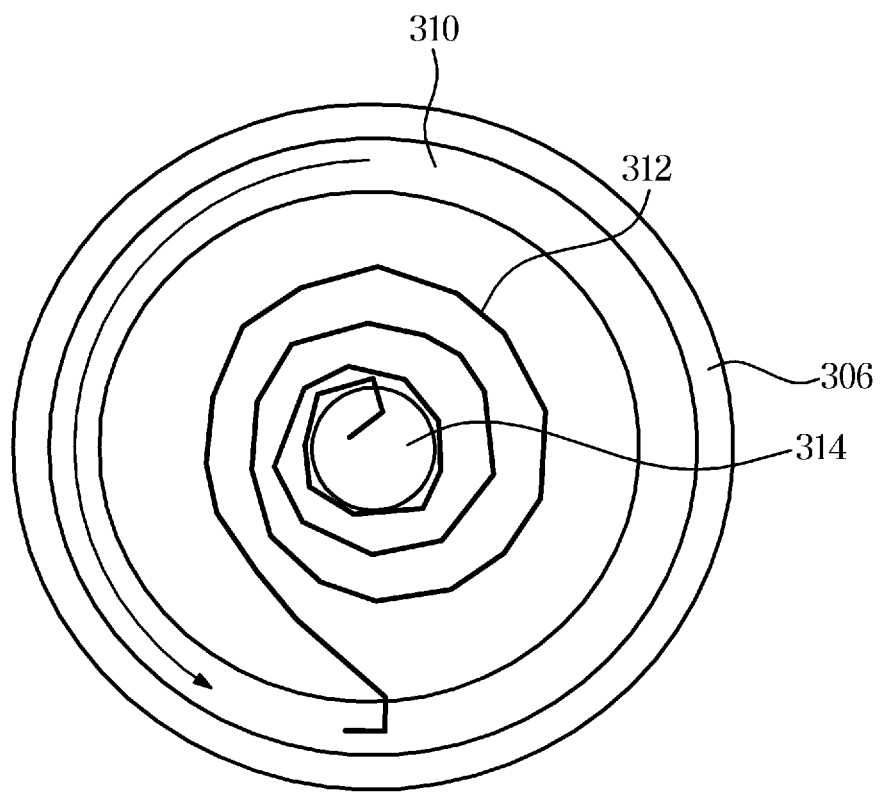

FIG. 3C is a view exemplarily illustrating the tension adjustment of the seat belt 130 according to the rotation of the motor 302. As illustrated in FIG. 3C, as the motor 302 rotates, the reduction gear 318 in the motor 302 may rotate and the internal rotating body 310 connected to the reduction gear 318 may rotate. The number of turns of the tension spring 312 may be increased/decreased by the rotation of the internal rotating body 310 and a torque for winding the seat belt rotation portion 314 surrounding the seat belt 130 may be also increased/decreased. The inertial moment of the reduction gear 318 may be designed to be sufficiently greater than the tension of the tension spring 312 because the number of turns of the tension spring 312 may not change when no voltage is applied to the motor 302.

The tension of the tension spring 312 may be changed according to the relative position of the internal rotating body 310 and the seat belt rotation portion 314 and the tension of the seat belt 130 may be changed. Referring to FIG. 3C, when the internal rotating body 310 rotates in a clockwise direction thereof, the number of turns of the tension spring 312 decreases, and as a result, the tension is weakened. When the internal rotating body 310 rotates in a counterclockwise direction thereof, the number of turns of the spring 312 increases, and as a result, the tension becomes stronger.

Accordingly, an absolute angle of the internal rotating body 310 is determined according to the rotation of the motor 302, so that the tension of the seat belt 130 may be actively adjusted. When the absolute angle of the internal rotating body 310 may be classified into a plurality of predetermined steps and a position (step) of the motor 302 for realizing the absolute angle of the internal rotating body 310 is set in advance, the absolute angle of the internal rotating body 310 may be realized by controlling the position of the motor 302, so that the tension of the seat belt 130 may be easily controlled to a predetermined size.

FIG. 4 is a view exemplarily illustrating a method of controlling a seat belt of a vehicle according to embodiments of the present invention. FIG. 4A is a view exemplarily illustrating an outline of a seat belt control method of a vehicle according to embodiments of the present invention. FIG. 4B is a view exemplarily illustrating determination of a collision risk level using information received from an ADAS Electronic Control Unit (ECU). FIG. 4C is a view exemplarily illustrating determination of a collision risk level using information received from the ACU ECU. FIG. 4D is a view exemplarily illustrating determination of a behavior risk level of a vehicle using information received from an ELECTRONIC STABILITY CONTROL (ESC) ECU. FIG. 4E is a view exemplarily illustrating determination of a final risk level based on determination results of an ADAS ECU, an ACU ECU, and an ESC ECU, respectively. FIG. 4F is a view exemplarily illustrating active control of tension of a seat belt based on the selected final risk level.

Figure 4A:
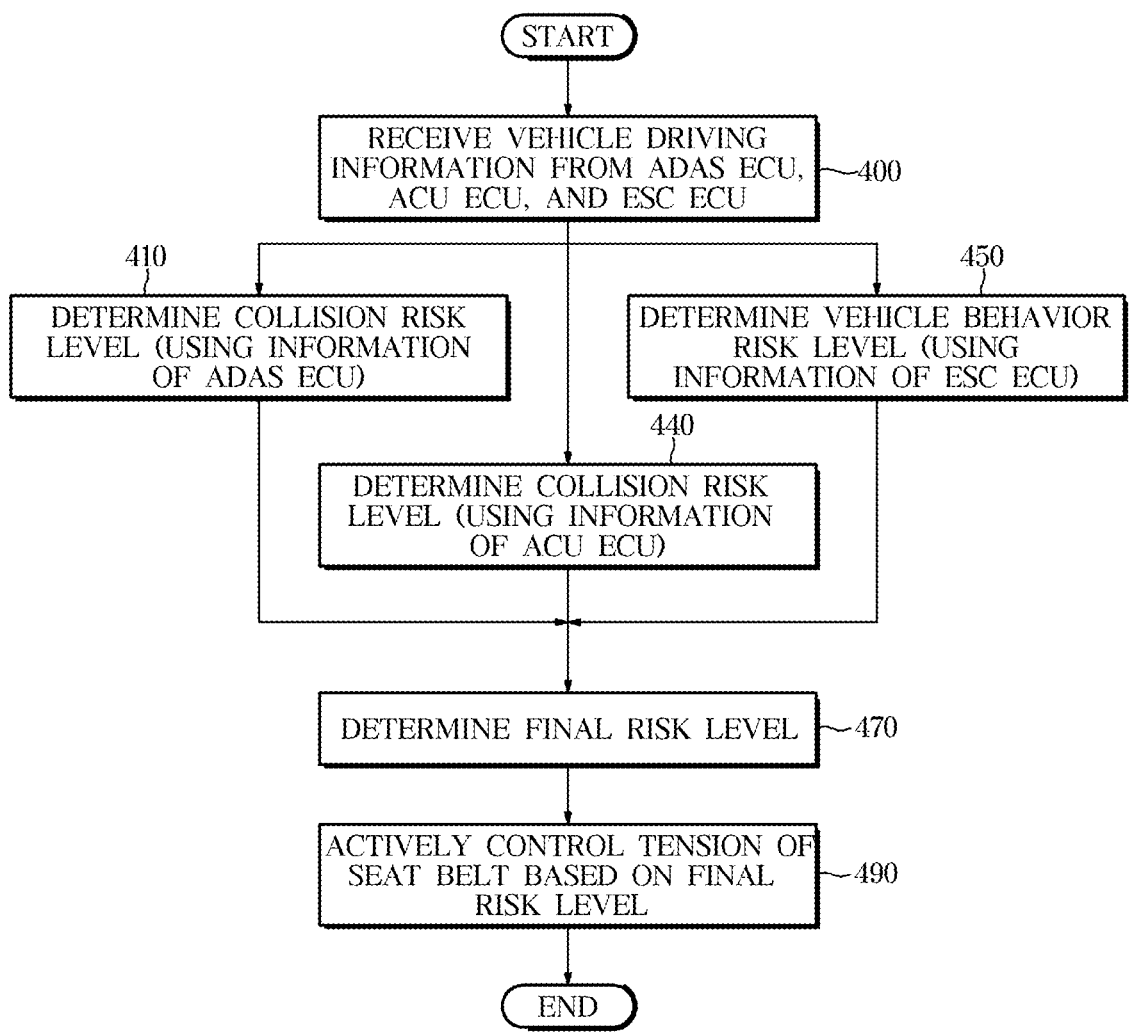
FIG. 4A is a view exemplarily illustrating an outline of a seat belt control method of a vehicle according to embodiments of the present invention.

FIG. 4A is a view exemplarily illustrating an outline of a seat belt control method of a vehicle according to embodiments of the present invention.

As illustrated in FIG. 4A, the seat belt ECU 190 may receive the vehicle driving information from the ADAS ECU 214, the ACU ECU 244, and the ESC ECU 274 (400). The vehicle driving information received from the ADAS ECU 214 may include the 'distance and relative speed to the long distance object', the 'distance and relative speed to the short distance object', and the 'lane departure information and collision information' illustrated by reference numeral 216 in FIG. 2B. The vehicle driving information received from the ACU ECU 244 may include the 'collision information' in each direction illustrated by reference numeral 246 in FIG. 2C. The vehicle driving information received from the ESC ECU 274 may include the 'vehicle model estimated value', the 'sensor measurement value', and the 'unstable behavior index' illustrated by reference numeral 276 in FIG. 2D.

The seat belt ECU 190 may determine a collision risk level using the information received from the ADAS ECU 214 (410). The determination of the collision risk level using the information received from the ADAS ECU 214 will be described in detail with reference to FIG. 4B, which will be described later.

The seat belt ECU 190 may determine the collision risk level using the information received from the ACU ECU 244 (440). The determination of the collision risk level using the information received from the ACU ECU 244 will be described in detail with reference to FIG. 4C, which will be described later.

The seat belt ECU 190 may determine a behavior risk level using the information received from the ESC ECU 274 (450). The determination of the behavior risk level using the information received from the ESC ECU 274 will be described in detail with reference to FIG. 4D, which will be described later.

The seat belt ECU 190 may determine a final risk level based on the determination result of the collision risk level of the ADAS ECU 214, the determination result of the collision risk level of the ACU ECU 244, (470), and the determination result of the behavior risk level of the ESC ECU 274. The determination of the final risk level will be described in detail with reference to FIG. 4E, which will be described later.

The seat belt ECU 190 may actively control the tension of the seat belt 130 based on the final risk level (490). In the normal situation through the active control of the seat belt 130, the tension of the seat belt 130 may be loosened, improving the comfort of the passenger.

In the very urgent situation, such as the collision step, the tension of the seat belt 130 may be strengthened to restrain the body of the passenger, ensuring the safety of the passenger. The active control of the tension of the seat belt 130 based on the final risk level will be described in detail with reference to FIG. 4F, which will be described later.

Figure 4B:
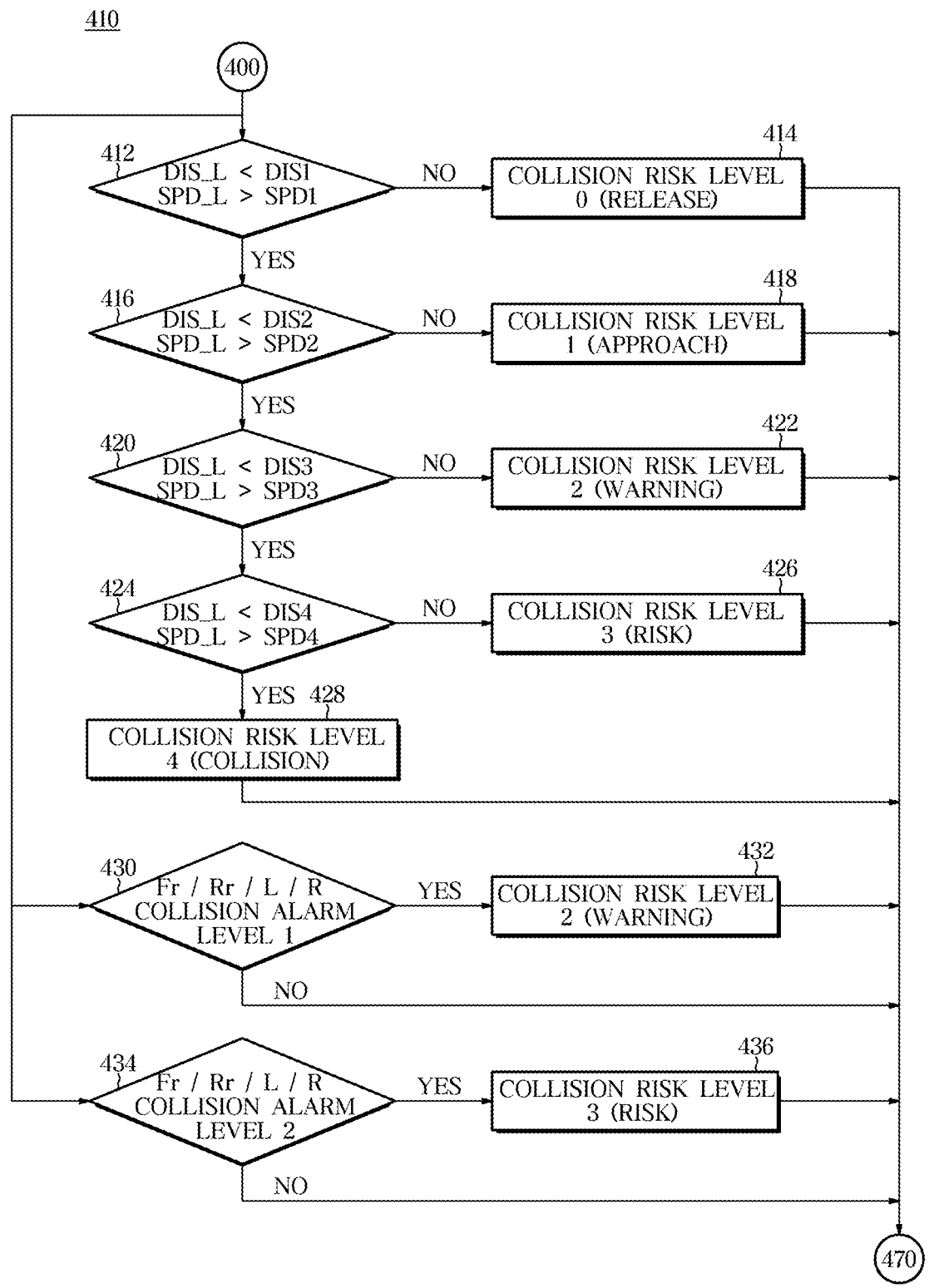
FIG. 4B is a view exemplarily illustrating determination of a collision risk level using information received from an ADAS Electronic Control Unit (ECU)

FIG. 4B is a view exemplarily illustrating determination of a collision risk level using information received from an ADAS Electronic Control Unit (ECU).

As illustrated in FIG. 4B, the seat belt ECU 190 may determine the collision risk level in five levels from a collision risk level 0 to a collision risk level 4 by use of the 'distance and relative speed to the long distance object', the 'distance and relative speed to the short distance object', and the 'lane departure information and collision information' received from the ADAS ECU 214.

First, the seat belt ECU 190 may determine the collision risk level in five levels from the collision risk level 0 to the collision risk level 4 based on the 'distance and relative speed to the long distance object', the 'distance and relative speed to the short distance object' (412-428).

In FIG. 4B, 'dis_L' is the 'distance to the long distance object', 'spd_L' is the 'relative speed with the long distance object', 'dis_L' is a 'distance to the short distance object', and 'spd_S' the 'relative speed with the short distance object'. 'spd1', 'spd2', 'spd3', and 'spd4' are reference values related to the relative speed (i.e., reference speed). 'dis1', 'dis2', 'dis3', and 'dis4' are reference values (i.e., reference distance) related to the distance, 'spd1', 'spd2', 'spd3', and 'spd4' are reference values (ie, reference speeds) related to the relative speed.

When a condition of 'dis_L<dis1 & spd_L>spd1' is not satisfied (NO in 412), that is, 'dis_L=dis1 & spd_L=spd1', the seat belt ECU 190 may determine a current state as the collision risk level 0 (release) (414). The collision risk level 0 (release) may represent that there is no risk of collision. The release may refer to releasing the seat belt 130 to prevent the tension on the seat belt 130 (i.e., user convenience in a normal state).

When the condition of 'dis_L<dis1 & spd_L>spd1' is satisfied (YES in 412) but the condition of 'dis_L<dis2 & spd_L>spd2' is not satisfied (NO in 416), the seat belt ECU 190 may determine the current state as a collision risk level 1 (approach) (418). The collision risk Level 1 (approach) may represent that there is no risk of collision but the vehicle is approaching an obstacle.

When the condition of 'dis_L<dis1 & spd_L>spd1' is satisfied (YES in 412) but the condition of 'dis_L<dis3 & spd_L>spd3' is not satisfied (NO in 420), the seat belt ECU 190 may determine the current state as a collision risk level 2 (warning) (422). The collision risk Level 2 (warning) may represent a state in which the collision may be provided in advance because of there is the risk of collision. In the instant case, the tension of the seat belt 130 may be slightly generated to prepare for the collision in advance.

When the condition of 'dis_L<dis3 & spd_L>spd3' is satisfied (YES in 420) but the condition of 'dis_L<dis4 & spd_L>spd4' is not satisfied (NO in 424), the seat belt ECU 190 may determine the current state as a collision risk level 3 (risk) (426). The collision risk Level 3 (risk) may represent a state in which a preparation for the collision may be confirmed because of the high risk of collision. In the instant case, the tension of the seat belt 130 may be sufficiently strengthened to prepare for the collision in advance.

When the condition of 'dis_L<dis4 & spd_L>spd4' is satisfied (YES in 424), the seat belt ECU 190 may determine the current state as a collision risk level 4 (collision) (428). The collision risk level 4 (collision) may control the seat belt 130 to suit the collision situation since the vehicle has already collided with the obstacle.

Furthermore, the seat belt ECU 190 may generate a collision alarm level by direction ADAS ECU 214 itself, i.e., Fr/Rr/L/R collision alarm level 0 and Fr/Rr/L/R collision alarm level 1 based on the signals detected by the ADAS 212.

The seat belt ECU 190 may determine the state of each of the Fr/Rr/L/R collision alarm level 0 and the Fr/Rr/L/R collision alarm level 1 (YES in 430, YES in 434), which are determined by the ADAS ECU 214 itself as the collision risk level 2 (warning) and the collision risk level 3 (risk) (432, 436).

The collision risk Level 2 (warning) may represent the state in which the collision may be provided in advance because of there is the risk of collision. The collision risk Level 3 (risk) may represent the state in which a preparation for the collision may be confirmed because of the high risk of collision.

A seat belt control in each of the collision risk level 0 to the collision risk level 4 illustrated in FIG. 4B will be described in detail with reference to FIG. 4F, which will be described later.

Figure 4C:
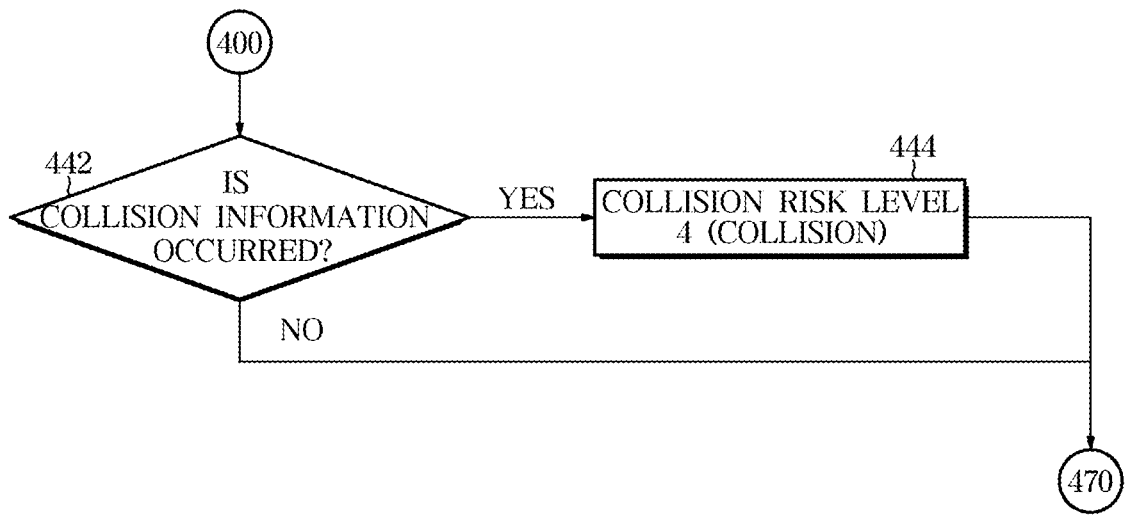
FIG. 4C is a view exemplarily illustrating determination of a collision risk level using information received from the ACU ECU.

FIG. 4C is a view exemplarily illustrating determination of a collision risk level using information received from the ACU ECU.

As illustrated in FIG. 4C, the seat belt ECU 190 may determine the collision risk level using the collision information in each direction received from the ACU ECU 244. Since the collision information in each direction received from the ACU ECU 244 is information generated when a collision actually occurs in the corresponding direction thereof, when the collision information is generated from the ACU ECU 244, the seat belt ECU 190 may determine that the collision has actually occurred in the corresponding direction thereof, and determine the current state as the collision risk level 4 (collision) (444). The collision risk level 4 (collision) may control the seat belt 130 to suit the collision situation since the vehicle has already collided with the obstacle.

Figure 4D:
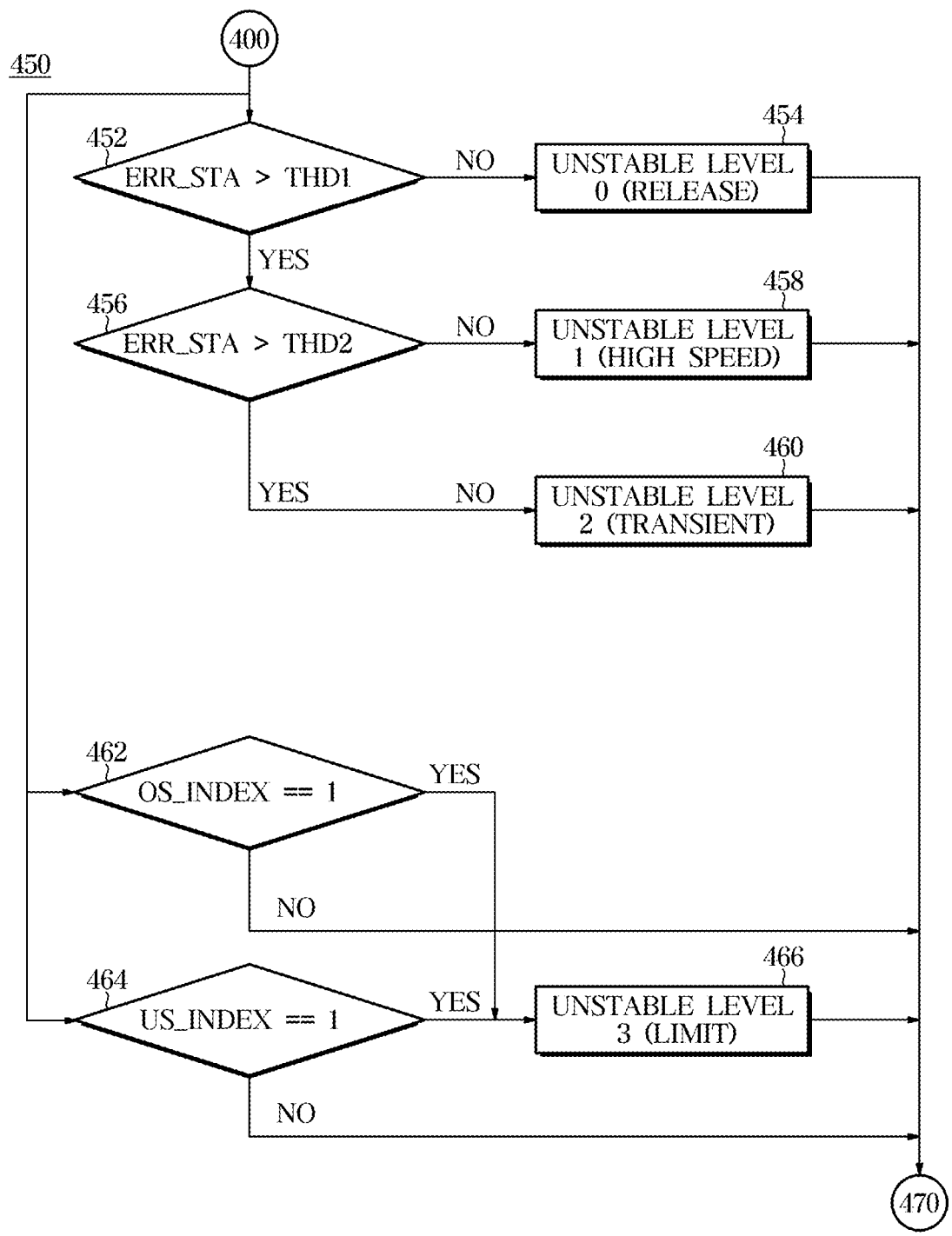
FIG. 4D is a view exemplarily illustrating determination of a behavior risk level of a vehicle using information received from an ELECTRONIC STABILITY CONTROL (ESC) ECU.

FIG. 4D is a view exemplarily illustrating determination of a behavior risk level of a vehicle using information received from an ELECTRONIC STABILITY CONTROL (ESC) ECU.

As illustrated in FIG. 4D, the seat belt ECU 190 may determine a behavior unstable level in four levels from an unstable level 0 to an unstable level 3 by use of the 'vehicle model estimated value', the 'sensor measurement value', and the 'unstable behavior index' received from the ESC ECU 274.

In FIG. 4D, 'err_sta' is the difference between a measured value and a modeled value for determining the behavior unstable level, and 'thd1' and 'thd2' are reference values (threshold values) related to the difference between the measured value and the modeled value. Also, in FIG. 4D, 'OS_index' may represent an oversteer detection value and 'US_index' may represent an understeer detection value.

In FIG. 4D, when the condition of 'err_sta>thd1' is not satisfied (NO in 452), the seat belt ECU 190 may determine a current behavior unstable level of the vehicle as the unstable level 0 (release) (454). The unstable level 0 (release) may represent that the vehicle drives very steadily. The release may refer to releasing the seat belt 130 to prevent the tension on the seat belt 130 (i.e., user convenience in the normal state).

When the condition of 'err_sta>thd1' is satisfied (YES in 452) but the condition of 'err_sta>thd2' is not satisfied (NO in 456), the seat belt ECU 190 may determine the current behavior unstable level of the vehicle as an unstable level 1 (high speed) (458). The unstable level 1 (high speed) may represent that the vehicle is driving at the high speed and is somewhat unstable.

When the condition of 'err_sta>thd2' is satisfied (YES in 456), the seat belt ECU 190 may determine the current behavior unstable level of the vehicle as an unstable level 2 (transient) (460). The unstable level 2 (transient) (460) may represent that the driving state of the vehicle exceeds a control limit and is largely unstable.

When the condition of 'OS_index==1' is satisfied (YES in 462) and the condition of US_index==1 is satisfied (YES in 464), the seat belt ECU 190 may determine the current behavior unstable level of the vehicle as the unstable level 3 (limit) (466). The unstable level 3 (limit) may represent that the driving state of the vehicle is very unstable and is in a dangerous state.

Figure 4E:
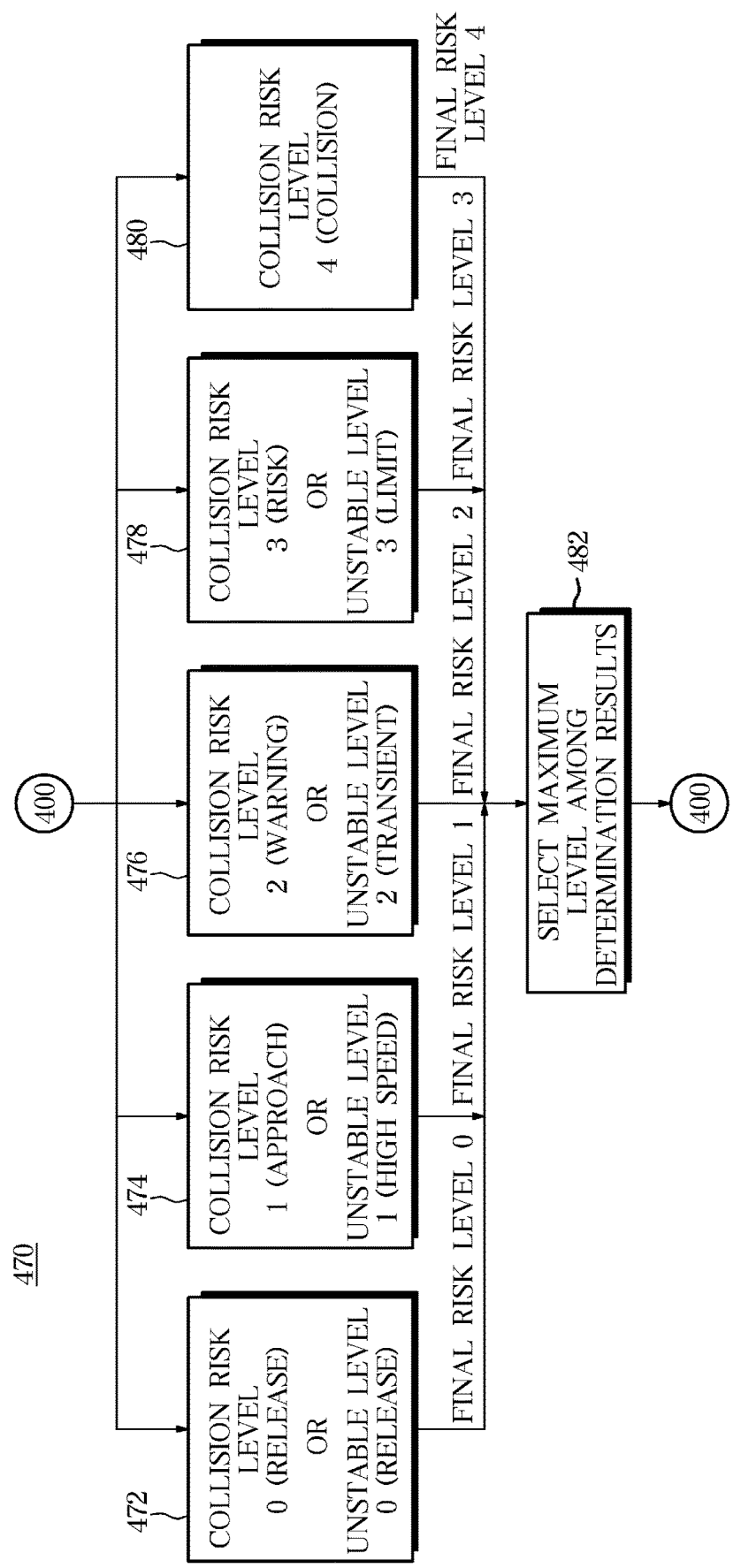
FIG. 4E is a view exemplarily illustrating determination of a final risk level based on determination results of an ADAS ECU, an ACU ECU, and an ESC ECU, respectively.
Figure 4F:
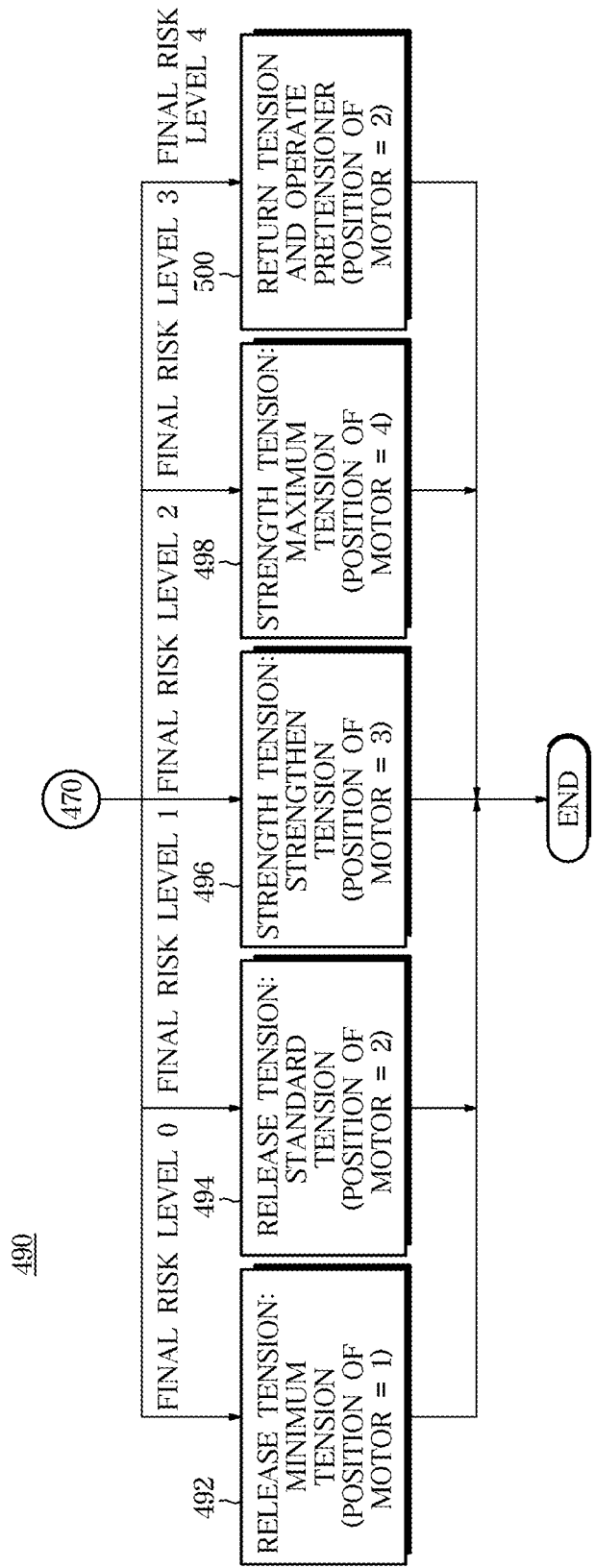
FIG. 4F is a view exemplarily illustrating active control of tension of a seat belt based on the selected final risk level.

FIG. 4F is a view exemplarily illustrating active control of tension of a seat belt based on the selected final risk level. As illustrated in FIGS. 4B to 4D described above, the seat belt ECU 190 may determine the collision risk levels (0 to 4) and the unstable levels (0 to 3) of the vehicle based on the vehicle driving information provided from the ADAS ECU 214, the ACU ECU 244, and the ESC ECU 274. The seat belt ECU 190 may determine the final risk level based on the determination result of the collision risk levels (0 to 4) and the unstable levels (0 to 3) of the vehicle. The final risk level may include four levels of 0 to 4.

As illustrated in FIG. 4E, the seat belt ECU 190 may determine the final risk level based on any one of the collision risk level and the unstable level at the same levels (levels 0, 1, 2, 3, and 4), and select a maximum level as the final risk level when the final risk level has a plurality of values.

For example, the seat belt ECU 190 may determine that the final risk level is '0' when the collision risk level is '0' or the unstable level is '0' (472). Furthermore, the seat belt ECU 190 may determine that the final risk level is '1' when the collision risk level is '1' or the unstable level is '1' (474). Furthermore, the seat belt ECU 190 may determine that the final risk level is '2' when the collision risk level is '2' or the unstable level is '2' (476). Furthermore, the seat belt ECU 190 may determine that the final risk level is '3' when the collision risk level is '3' or the unstable level is '3' (478). Furthermore, the seat belt ECU 190 may determine that the final risk level is '4' when the collision risk level is '4' or the unstable level is '4' (480).

As illustrated in FIGS. 4B to 4D, the collision risk level 0 to the collision risk level 3 may be obtained through various paths of the ADAS ECU 214 and the ESC ECU 274, and the unstable level 0 to the unstable level 3 may be also obtained through various paths of the ESC ECU 274. Therefore, as illustrated FIG. 4E, the final risk level may be determined through an 'OR' operation of the collision risk level and the unstable level. Because of this, the final risk level may have a plurality of values. The collision risk level 4 may be obtained through a single path of the ACU ECU 244 only when a real collision occurs, so that a separate logical operation is not required.

The seat belt ECU 190 may select the final risk level among the plurality of final risk level values that generate at the maximum level. For example, when a final risk level 2 and a final risk level 3 generate, the seat belt ECU 190 may actively control the seat belt 130 based on the highest final risk level 3 among these. Alternatively, for example, when a final risk level 0 and a final risk level 4 generate, the seat belt ECU 190 may actively control the seat belt 130 based on the highest final risk level 4 among these. Furthermore, for example, when a single value of the final risk level 2 generates, the seat belt ECU 190 may actively control the seat belt 130 based on the single final risk level 0.

FIG. 4F is a view exemplarily illustrating active control of tension of a seat belt based on the selected final risk level. As described above with reference to FIG. 4E, the seat belt ECU 190 may select the maximum level among the values of the final risk level generated to actively control the seat belt 130.

To the present end, the seat belt 130 may be classified a degree of the tension of the seat belt 130 into five levels of 'minimum tension', 'standard tension', 'strengthen tension', 'maximum tension', 'tension return and pretensioner operation'. The position (step) of the motor 302 corresponding to each level of the tension of the seat belt 130 may be set and controlled. For example, the position (step) of the motor 302 may be set to 1 in the 'minimum tension', the position (step) of the motor 302 may be set to 2 in the 'standard tension', the position (step) of the motor 302 may be set to 3 in the 'strengthen tension', the position (step) of the motor 302 may be set to 4 in the 'maximum tension', and the position (step) of the motor 302 may be set to 2 (standard tension) in the 'tension return and pretensioner operation'. Setting the position (step) of the motor 302 to 2 (standard tension) in the 'tension return and pretensioner operation' is to prevent the pretensioner operation to be performed by the seat belt 130 in the collision situation.

For reference, returning the tension may refer to applying the tension to the seat belt 130 in the loose state.

As illustrated in FIG. 4F, when final risk level 0 is selected, the seat belt ECU 190 may release the tension of the seat belt 130 to maintain the seat belt 130 at the minimum level so that the passenger can feel comfortable from a pressure of the seat belt 130 (492). To the present end, the position (step) of the motor 302 may be controlled to be 1.

Further, when 'final risk level 1' is selected, the seat belt ECU 190 may return the tension of the seat belt 130 to maintain the standard tension so that it is ready to restrain the passenger's body through the seat belt 130 if necessary (494). To the present end, the position (step) of the motor 302 may be controlled to 2.

Further, when final risk level 2 is selected, the seat belt ECU 190 may further return the tension of the seat belt 130 to maintain the strengthen tension to further restrain the passenger's body through the seat belt 130 (496). To the present end, the position (step) of the motor 302 may be controlled to 3.

Furthermore, when final risk level 3 is selected, the seat belt ECU 190 may further return the tension of the seat belt 130 to maintain the maximum tension, further safely restraining the passenger's body through the seat belt 130 (498). To the present end, the position (step) of the motor 302 may be controlled to 4.

Furthermore, when final risk level 4 is selected, the seat belt ECU 190 may maintain the tension of the seat belt 130 in the standard tension so that it is ready to restrain the passenger's body through the seat belt 130 (500). To the present end, the position (step) of the motor 302 may be controlled to 2. Setting the position (step) of the motor 302 to 2 (standard tension) despite the selection of the final risk level 4 having the highest risk is to prevent the pretensioner operation to be performed by the seat belt 130 in the collision situation.

According to an aspect of the present invention as described above, it is possible to reduce the tension of the seat belt in the normal situation in which the collision does not occur by appropriately adjusting the tension of the seat belt based on the driving state of the vehicle, providing convenience to a passenger. In the collision situation, the safety of the passenger may be ensured by sufficiently increasing the tension of the seat belt.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
   a seat belt;
   a driving assistance device configured to obtain vehicle driving information for assisting a driving of the vehicle; and
   a controller coupled to the driving assistance device and configured to determine a collision risk level of the vehicle and a vehicle behavior risk level based on the vehicle driving information, and adjust a tension of the seat belt based on the collision risk level and the vehicle behavior risk level,
   wherein the controller further determines the vehicle behavior risk level by use of a difference between a measured value and a modeled value for determining a behavior unstable level, an oversteer detection value, and an understeer detection value.

2. The vehicle according to claim 1,
   wherein the controller is configured to classify the collision risk level and the vehicle behavior risk level into a plurality of risk levels, and to adjust the tension of the seat belt to cope with one of the plurality of risk levels corresponding to a current driving state of the vehicle.

3. The vehicle according to claim 2,
   wherein the tension of the seat belt includes a first tension smaller than a predetermined reference tension and a second tension larger than the predetermined reference tension, and
   wherein the second tension is to restrain the passenger's body to a seat of the vehicle.

4. The vehicle according to claim 3,
   wherein a plurality of tensions greater than the first tension and smaller than the second tension are further provided between the first tension and the second tension.

5. The vehicle according to claim 1,
   wherein the collision risk level includes a plurality of levels different from each other, and
   wherein the vehicle behavior risk level includes a plurality of levels different from each other.

6. The vehicle according to claim 5, wherein the controller is configured to:

determine a plurality of final risk levels from a combination of the plurality of collision risk levels and the plurality of vehicle behavior risk levels; and
adjust the tension of the seat belt based on a final risk level of a highest risk among the plurality of final risk levels.

7. The vehicle according to claim 6, further including:
a motor configured to adjust the tension of the seat belt,
wherein the controller is configured to control the motor to implement the tension corresponding to each of the plurality of final risk levels.

8. The vehicle according to claim 7, wherein the controller is configured to:
preset a control amount of the motor configured for implementing the tension corresponding to each of the plurality of final risk levels; and
when the final risk level of the highest risk among the plurality of final risk levels is selected, control the motor with a control amount corresponding to the selected final risk level.

9. A method of controlling a vehicle, the method comprising:
obtaining, by a controller, vehicle driving information for assisting a driving of the vehicle;
determining a collision risk level of the vehicle and a vehicle behavior risk level based on the vehicle driving information; and
adjusting, by the controller, a tension of a seat belt based on the collision risk level and the vehicle behavior risk level,
wherein, the vehicle behavior risk level is further determined, by the controller, by use of a difference between a measured value and a modeled value for determining a behavior unstable level, an oversteer detection value, and an understeer detection value.

10. The method according to claim 9, wherein the adjusting of the tension of the seat belt includes:
classifying the collision risk level and the vehicle behavior risk level into a plurality of risk levels; and
adjusting the tension of the seat belt to cope with one of the plurality of risk levels corresponding to a current driving state of the vehicle.

11. The method according to claim 10,
wherein the tension of the seat belt includes a first tension having a minimum tension enough not to press a passenger and a second tension having a tension to restrain the passenger's body to a seat of the vehicle.

12. The method according to claim 11, wherein a plurality of tensions greater than the first tension and smaller than the second tension are further provided between the first tension and the second tension.

13. The method according to claim 9,
wherein the collision risk level includes a plurality of levels different from each other, and
wherein the vehicle behavior risk level includes a plurality of levels different from each other.

14. The method according to claim 13, wherein the adjusting of the tension of the seat belt includes:
determining a plurality of final risk levels from a combination of the plurality of collision risk levels and the plurality of vehicle behavior risk levels; and
adjusting the tension of the seat belt based on a final risk level of a highest risk among the plurality of final risk levels.

15. The method according to claim 13, wherein the adjusting of the tension of the seat belt includes:
implementing a tension corresponding to each of the plurality of final risk levels using a motor.

16. The method according to claim 15, wherein the adjusting of the tension of the seat belt includes:
presetting a control amount of the motor configured for implementing the tension corresponding to each of the plurality of final risk levels; and
when a final risk level of a highest risk among the plurality of final risk levels is selected, controlling the motor with a control amount corresponding to the selected final risk level.

17. The method according to claim 9, further including:
obtaining the vehicle driving information using a driving assistance device.

18. A seat belt apparatus comprising:
a seat belt; and
a controller configured to adjust a tension of the seat belt based on a collision risk level and a vehicle behavior risk level of a vehicle based on vehicle driving information obtained through a driving assistance device that obtains the vehicle driving information for assisting a driving of the vehicle,
wherein the controller determines the vehicle behavior risk level by use of a difference between a measured value and a modeled value for determining a behavior unstable level, an oversteer detection value, and an understeer detection value.

* * * * *